April 19, 1960
E. G. SPENCER
2,933,076
LIQUEFIED PETROLEUM FUEL SYSTEM FOR INTERNAL COMBUSTION ENGINES
Filed Feb. 1, 1956
6 Sheets-Sheet 6
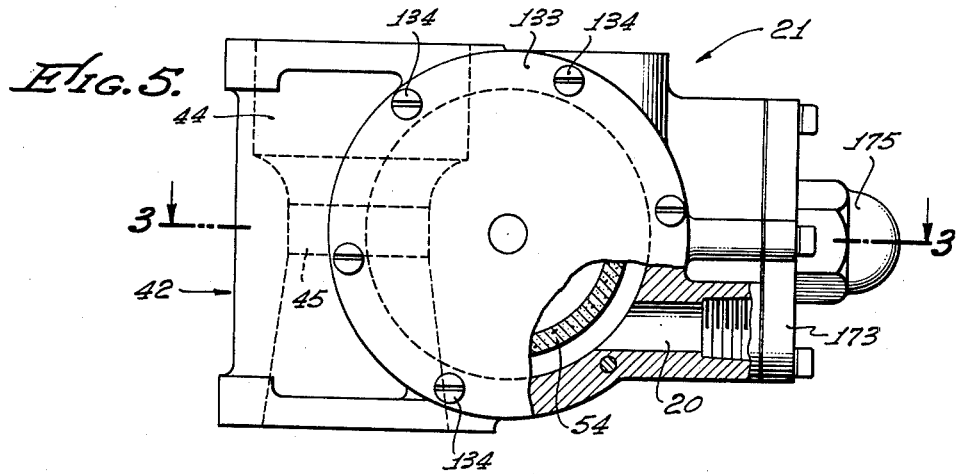
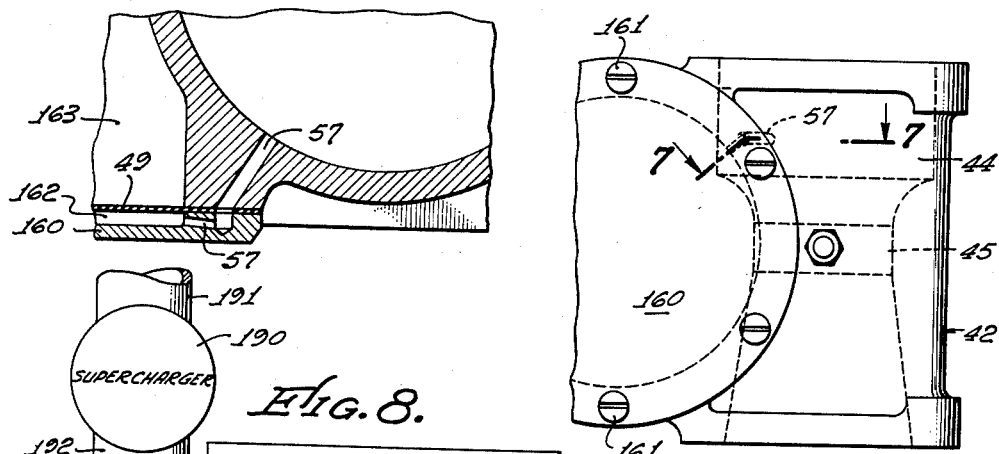
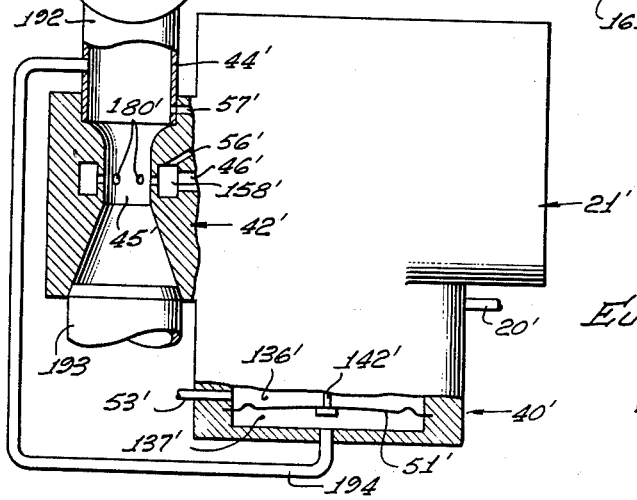
EUGENE G. SPENCER,
INVENTOR.
BY
ATTORNEY.

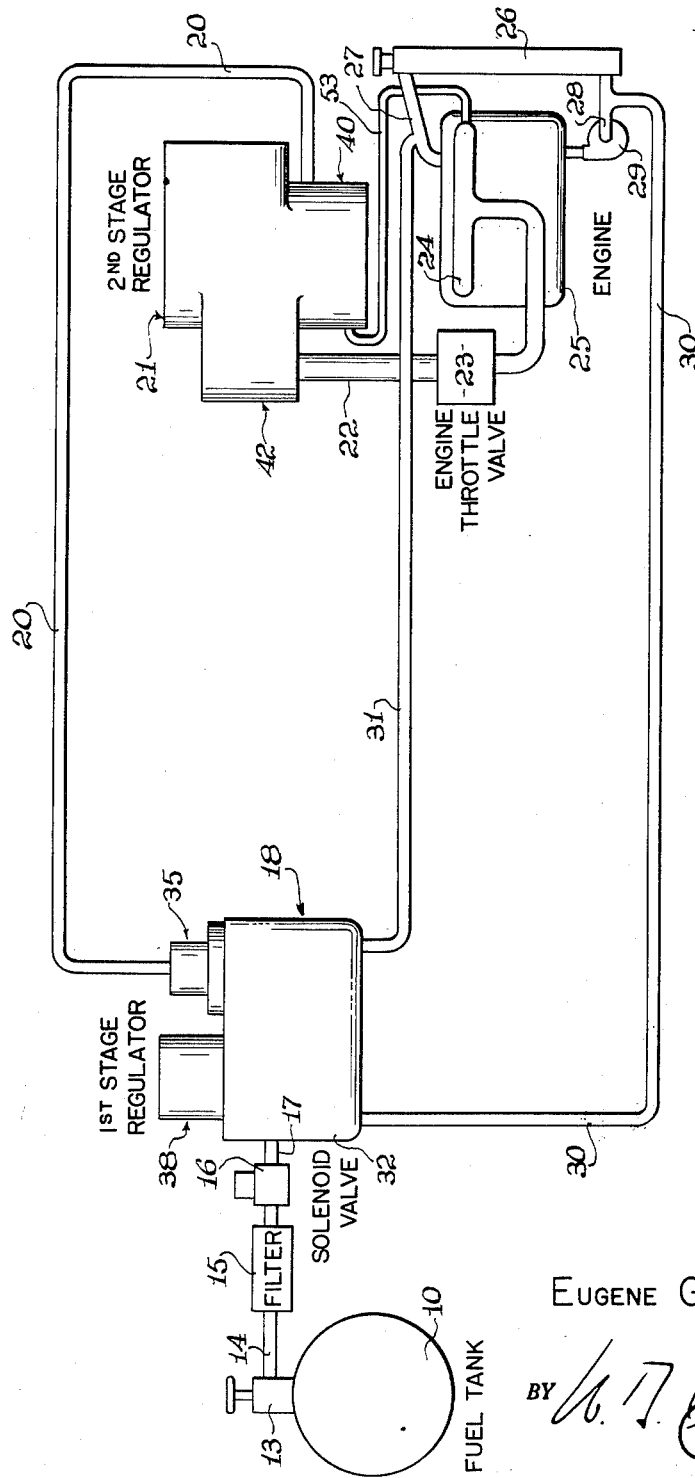

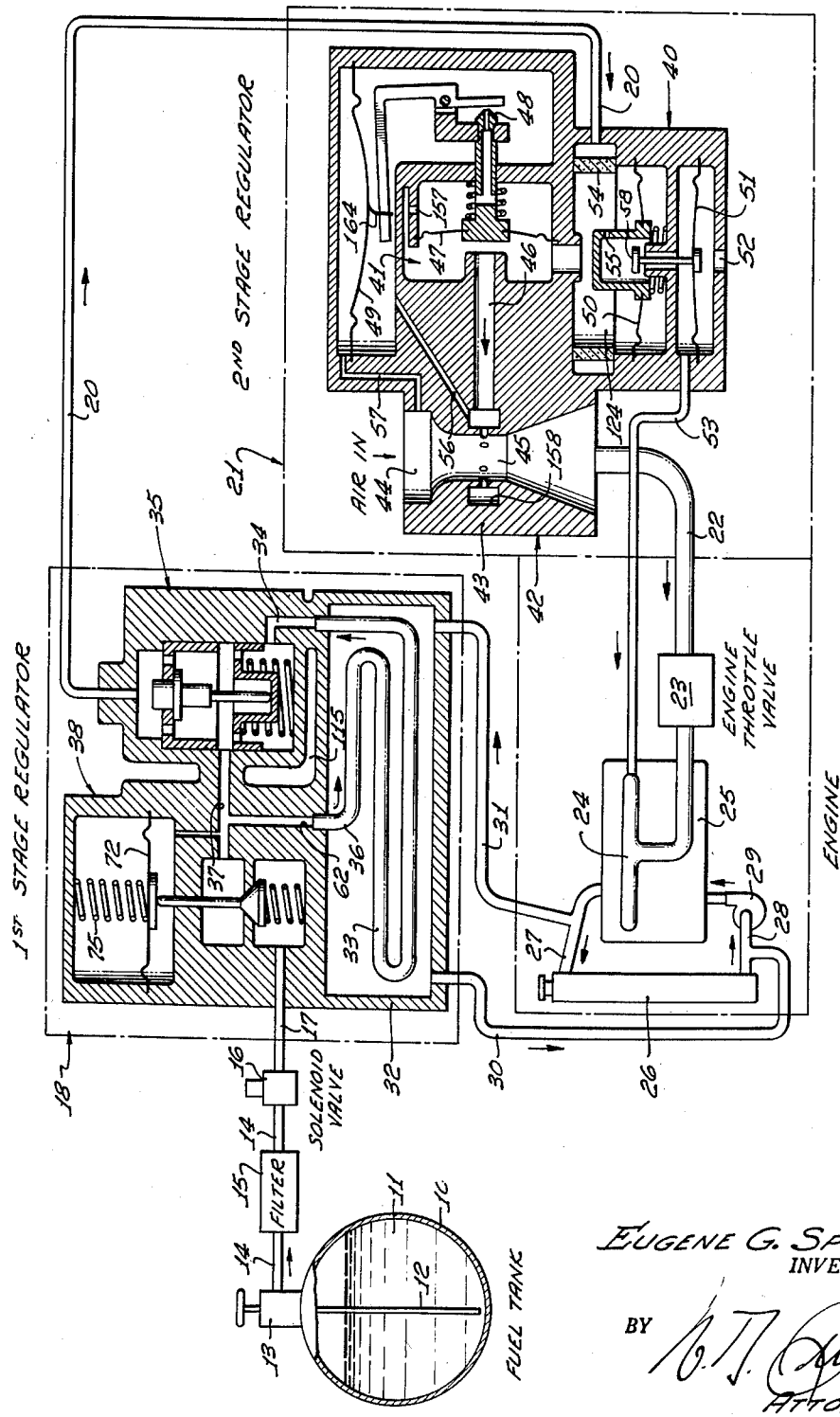

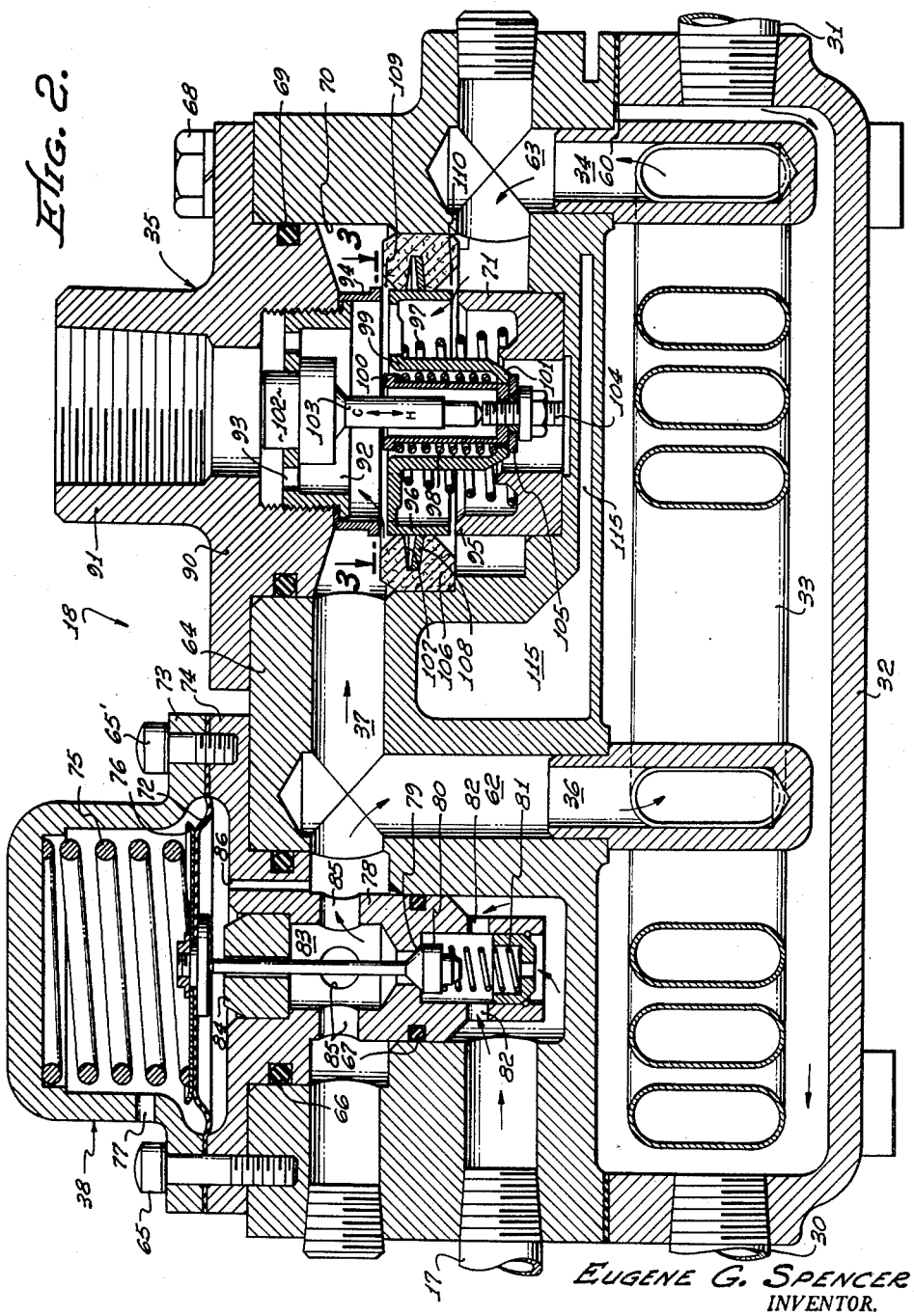

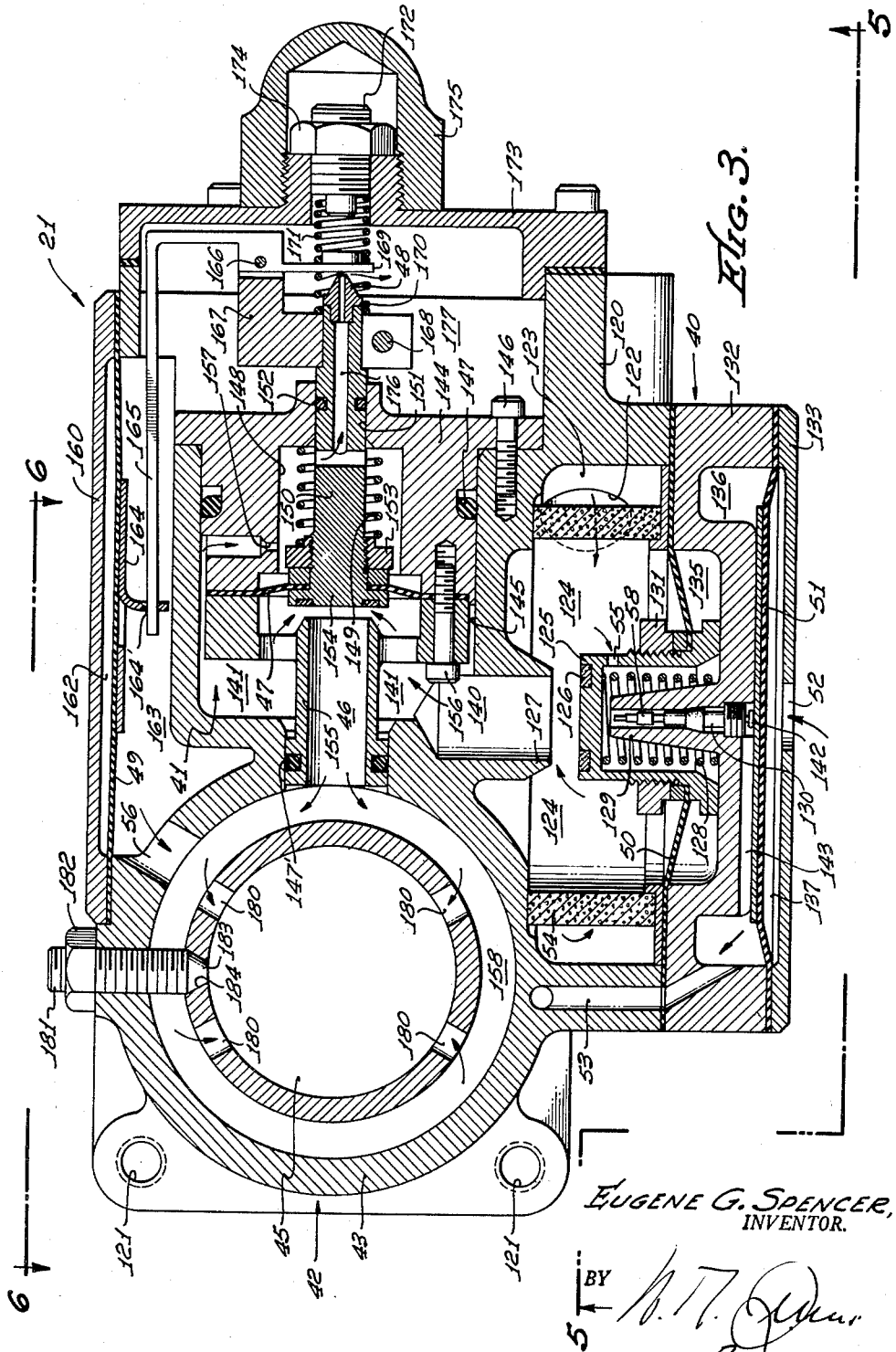

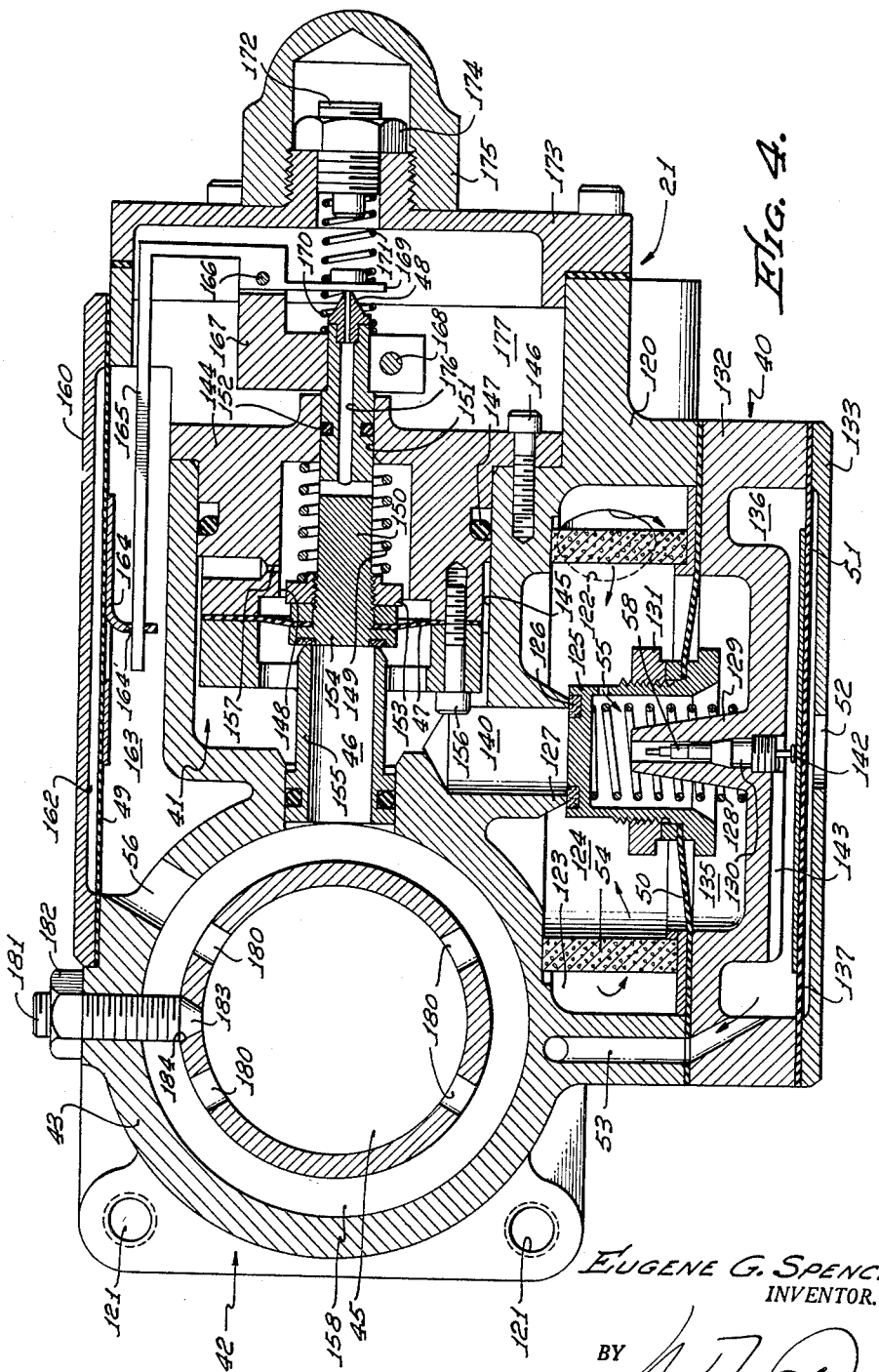

United States Patent Office 2,933,076
Patented Apr. 19, 1960

2,933,076

LIQUEFIED PETROLEUM FUEL SYSTEM FOR INTERNAL COMBUSTION ENGINES

Eugene G. Spencer, Northridge, Calif.

Application February 1, 1956, Serial No. 562,870

31 Claims. (Cl. 123—120)

This invention relates to internal combustion engines and more particularly to a novel method and system for automatically supplying the same with a predetermined fuel and air mixture irrespective of changing supply conditions where the fuel employed is liquefied petroleum gas such as propane or butane and hereinafter referred to as liquefied petroleum.

In recent years the many advantages attending the use of liquefied petroleum as the fuel for self-propelled prime power units have lead to its wide scale adoption in both stationary and moving applications. However, the ever increasing popularity of this fuel has been accompanied by many vexatious problems most of which continue to plague both the designer and the user of this equipment. Unlike systems using gasoline as the fuel, liquefied petroleum systems as presently employed store the fuel in liquid form at pressures ranging from 20 to 250 pounds per square inch in combination with a fuel supply system capable of converting this saturated liquid to a gaseous state at substantially atmospheric pressure for delivery to the engine manifold.

This conversion involves numerous problems including not only wide pressure fluctuations but wide temperature changes often ranging below zero. These wide variations in both temperature and pressure within the system itself taken in combination with wide pressure and climatic variations in the environment in which these fuel systems are used provide the designer with a real challenge which has not been successfully met heretofore.

Problems of a secondary nature include those of providing adequate and effective filtering devices for the fuel in both liquid and vapor form. Another important consideration is a design of the several components in such manner that they may be easily and quickly serviced in the field by simple tools merely by removal of the malfunctioning component as a unit without disturbing the other components. Such a design makes it possible to replace the defective component by a new or reconditioned one by relatively unskilled personnel and with negligible loss of time. The defective component can then be returned directly to a central service station for expert checking and repair.

A particularly outstanding feature of my design is the use of separate sensitive pilot controls in combination with certain of the master controls making it possible not only to design these auxiliaries in exceptionally compact units but adding greatly to their sensitivity and rendering the units substantially immune to vibrations and the irregular and oftentimes severe shock loads customarily encountered in the operation of such power units and particularly those of the self-propelled type.

Still another highly significant feature of my invention resides in the fact that my system is designed to supply fuel to the low pressure regulator at both an accurately controlled predetermined pressure and temperature in contrast with prior systems which merely endeavor to supply fuel at a controlled pressure. This objective is accomplished according to my invention by accurately regulating the temperature of the fuel at a critical point in the system, namely, immediately adjacent the exhaust side of the high pressure regulator.

Another highly important and unique feature of the invention is the location of the low pressure regulator in close association with the carburetor. Moreover, my pressure regulator is so constructed and designed as to discharge fuel directly into the carburetor at a pressure equal to that of the combustion air supply and this is possible despite wide fluctuations in the air supply pressure as occur with changes in altitude.

Another problem successfully solved for the first time is that of providing a positive and foolproof fuel shut-off device operable to stop the flow of all fuel to the engine under certain contingencies including a failure of the operator to exercise minimum precautionary measures when stopping the motor.

Accordingly, it is a primary object of the present invention to provide a liquefied petroleum fuel supply system for internal combustion engines featuring maximum safety, unusual simplicity, compactness and a hitherto unattained operating efficiency.

More particularly, it is an important object of the invention to provide a liquefied petroleum fuel supply system having its principal auxiliaries collected in two very compact sub-assemblies one of which is located immediately adjacent the engine manifold and the other of which may be separately positioned in an area apart from but in close proximity to the engine. Stated more specifically, the principal sub-units of my system include one housing the high pressure regulator, the constant temperature regulator and a heat exchanger, while the other principal unit includes the low pressure regulator, the safety shut-off valve and the carburetor proper. For convenience, the first may be called a first-stage regulator and is connected to the fuel tank. Likewise, the latter may be termed a second-stage regulator and is mounted in the closest practical association with the engine manifold. Unusual compactness in the first stage regulator is achieved by passing only a portion of the very cold gas discharged by the pressure regulator through the heat exchanger and merging this highly heated gaseous fuel with the remaining or unheated gas within the temperature control valve itself. Accordingly, a major portion of the gas is not heated and hence its density does not change until it is mixed within the temperature control valve. Compactness at the second-stage regulator is obtained by the use of sensitive pilot valves actuated by small pressure differences to control master valves actuated by relatively high pressures in contrast to those acting on the pilot valves. These features as well as the unitized design of the several sub-components will be described in detail below.

A further object is the provision of a low pressure regulator design housed within the casing for the carburetor and discharging directly into the distributing annulus of the carburetor. Moreover, the unique construction of this regulator and the control therefor not only renders it immune to vibration but assures a control of micro sensitivity.

Still another feature is the provision of a system requiring no by-pass fuel line around the engine throttle valve to provide for idling operation of the engine as has been considered mandatory in prior systems despite the recognized hazards.

Numerous other novel features and advantages of the arrangement will become apparent from the following detailed description of two illustrative embodiments of the invention taken in connection with the accompanying drawings, wherein:

Figure 1 is a schematic representation of the fuel system as a whole forming the present invention and showing only the main features of the individual components;

Figure 1A is a schematic representation of the fuel system as a whole and showing the fuel tank, the first stage regulator, and the intervening auxiliaries spaced remotely from the engine being supplied with fuel;

Figure 2 is a vertical sectional view through the first-stage regulator and showing the high pressure device in closed position;

Figure 3 is a sectional view through the second-stage regulator taken along line 3—3 on Figure 5 and showing both the safety cut-off valve and the low pressure regulator in open positions;

Figure 4 is a view similar to Figure 3 but showing the cut-off valve and the pressure regulator in their closed positions;

Figure 5 is an elevational view of the regulator partly in section taken along line 5—5 on Figure 3;

Figure 6 is an elevational view of the regulator taken along line 6—6 on Figure 3;

Figure 7 is a fragmentary sectional view taken along line 7—7 on Figure 6;

Figure 8 is a schematic showing of an alternate form of the second-stage regulator modified to the slight extent necessary for use with a supercharger.

Referring now to the drawings, and more particularly to Figure 1, it will be seen that my fuel system comprises a pressurized fuel tank 10 suitably mounted at a point remote from the engine and charged with a quantity of liquid petroleum 11 such as propane under any suitable pressure ranging between 20 to 250 pounds per square inch. This fuel is conducted from the tank by a pipe 12 passing through a shut-off valve 13, thence via a conduit 14 through any conventional liquid filter 15 and an electric solenoid shut-off valve 16 into the inlet 17 of the first-stage regulator assembly generally indicated at 18.

The discharge end of the first-stage regulator is connected to a gaseous fuel line 20 leading to the inlet of a second-stage regulator assembly generally indicated at 21. The properly and accurately proportioned fuel and air mixture discharging from unit 21 passes by way of pipe 22 to the engine throttle valve indicated at 23 and into the manifold 24 of any conventional internal combustion engine 25.

This engine includes the usual water cooling system having a radiator 26 connected in circuit with the engine by the usual conduits 27, 28 and the water circulating pump 29. Connected in parallel with the radiator and cooling water circuit of the engine is a second water circuit formed by conduits 30, 31 having their ends connected to the opposite ends of the heat exchange jacket 32 and forming a part of the first-stage regulator assembly. The other portion of the heat exchanger comprises a tortuous conduit 33 of high heat conductive material having one end 34 connected to one side of a thermostatic regulator valve generally designated 35. The other end 36 of heat exchanger coil 33 is connected to a mid-portion of a conduit 37 having one end connected to the outlet of the high pressure regulator 38 and its other end connected to thermostatic regulator valve 35.

For present purposes it will be understood that the principal components of the ssecond-stage regulator include a safety shut-off valve 40, a low pressure regulator 41, and a carburetor or fuel and air mixing device 42. Carburetor 42 comprises essentially a venturi 43 having an air inlet 44, a gaseous fuel inlet at throat 45 and a flaring discharge end connecting with conduit 22 leading to the engine manifold. Gaseous fuel at approximately atmospheric pressure is led into the fuel distributing annulus of the venturi from the low pressure regulator 41 by a conduit 46. The pressure regulator includes a master diaphragm valve 47, a pilot valve 48, and a pressure sensitive diaphragm actuator 49 for valve 48.

Also housed within the unitary second-stage regulator is a safety cut-off valve generally designated 40. This valve has a master diaphragm valve 50 and a pilot valve control therefor actuated by diaphragm 51. The outer face of diaphragm 51 is vented to the atmosphere through port 52 while its opposite side is connected to the manifold through a bleed conduit 53. Surrounding the master safety shut-off valve 50 is a special gas filter ring 54.

As illustrated in Figure 1 the valves of the second-stage regulator are shown open as they are when the engine is operating and the fuel line is under pressure. However, if the engine stops or is cut off for any reason the safety cut-off valve 40 closes and provides positive assurance against any fuel flow to the engine or to any point in the fuel supply system beyond the inlet to safety cut-off valve 40. However, immediately upon the turning over of the engine and the creation of any appreciable pressure reduction in the engine manifold, this suction pressure will be transmitted through bleed passage 53 to the upper side of safety shut-off diaphragm 51. The higher atmospheric pressure acting on the lower side of the diaphragm will then be effective to open bleed valve 58 controlled by this diaphragm and bleed fuel vapor from the lower side of master diaphragm valve 50 faster than it can flow into this chamber through small bleed port 55. In consequence, the main cut-off valve opens and allows fuel to flow into the chamber on the left-hand side of the low pressure regulator valve 47 opening this valve and allowing the fuel to flow through passage 46 to the throat 45 of the venturi and mix with the air passing to the motor. Any tendency for the fuel pressure to vary from the optimum will be detected and corrected by the pilot valve 48 in response to the control provided by diaphragm 49 having its opposite sides connected by conduits 56 and 57 within the annulus and air inlet, respectively, of the venturi.

Referring now to the first-stage regulator assembly 18 as an entity as shown in enlarged detail in Figure 2, it will be noted that the high pressure regulator 38 is readily removable as a unit in case of any maulfunctioning or need for inspection. This is accomplished merely by removing cap screws 65 and lifting the unit from its well within main casing 64 along with the sealing O-rings 66 and 67, the regulator housing members being held assembled by a plurality of cap screws 65'.

Another sub-assembly which can be removed and replaced substantially as a unit comprises the automatic temperature control unit 35 held assembled to casing 64 as by cap screws 68. When these are removed the upper half of the unit along with its sealing O-ring 69 and all except the lower valve seat can be withdrawn from bore 70.

The heat exchange unit per se is a relatively simple device comprising a cup-shaped casing, the upper rim edges of which are sealed to the bottom of casing 64 by means of a gasket 60 and cap screws located at the lower rim of the casing but not visible in the drawings. The opposite ends of this casing are connected by conduits 30 and 31 in circuit with the hot water flowing through the radiator, the hot water entering through conduit 31 and leaving through conduit 30. The other or gas circuit of the heat exchanger is formed by the thin-walled high heat-conductive coil 33 having its inlet end 36 in communication with the vertically extending inlet passage 62 formed in the walls of main casing 64. Its outlet end 34 exhausts into a passage 63 leading in an annular chamber surrounding a ring 71 having its base firmly fixed to casing 64. This ring and its function as part of regulator valve 35 will be described in greater detail presently following a description of the high pressure regulator 38.

Regulator 38 comprises a flexible diaphragm 72 held captive between two generally cup-shaped casing 73 and 74 by cap screws 65. Upper casing 73 encloses a very stiff coil spring 75 having its lower end bearing on the diaphragm through a protective plate 76. Housing 73 is vented to the atmosphere through an opening 77. Lower casing 74 has a downwardly extending tubular element 78 provided with a valve seat 79 intermediate its ends for a valve 80 which is urged against this seat by coil spring 81. The high pressure liquid fuel enters the regulator through conduit 17 and one or more radial ports 82. Initially, spring 75 is powerful enough to depress valve 80 and allow the fuel to pass upwardly into the expansion chamber 83. Before the pressure builds up in this chamber, spring 75 will hold diaphragm 72 against the combination stop and valve stem guide 84 with valve 80 fully open so that the pressure will build up quickly in expansion chamber 83. This gaseous fuel passes rapidly through a plurality of ports 85 into passages 62 and 37 with a portion of the gas flowing upwardly through a rather large diameter bleed port 86 to the underside of flexible diaphragm 72. If the flow of the fuel vapor through passages 37 and 62 is blocked or restricted as it normally is, the pressure will gradually build up under the diaphragm, overcome spring 75 and allow spring 81 to close valve 80. On the other hand, if the engine is operating, then fuel vapor will be constantly bled from the distributing passages 37 and 62 and the pressure on the underside of the diaphragm, as well as in expansion chamber 83, will be maintained at a predetermined intermediate value between the high pressure exisiting in the fuel tank and the intermediate pressure at the inlet to the low pressure regulator described above.

It will, of course, be understood that a very marked reduction in pressure occurs as the liquid fuel flows past the high pressure reduction valve 80. In consequence of this and the change of state from liquid to gas, a very sharp temperature reduction takes place within expansion chamber 83. In fact, it is not uncommon for these temperatures to reach sub-zero values if the rate of fuel consumption is fairly high. As will be appreciated, these very low temperatures introduce problems and variables for which it is difficult to provide proper control and compensation. This is due to several factors including the distance between the first stage pressure regulator and the point of fuel consumption, the proximity of other engine components the operating temperatures of which vary over a wide range, and particularly the fact that the ambient temperature in which the system is functioning may vary from sub-zero to well above 100 degrees F.

The present invention proposes to isolate these variables to the maximum practical extent so far as the effect on the operation of the high pressure regulator is concerned. This is done primarily by locating the automatic temperature regulator valve generally designated 35 as close as possible to the high pressure regulator and to the heat exchanger while at the same time making adequate provision for isolating the temperature regulator from ever changing transient conditions in the pressure regulator and particularly in the heat exchanger. This is done by separating the temperature regulator from the heat exchanger and the high pressure regulator except for the necessary gas connections provided by conduits 37 and 63. Note that there is a rather narrow but important air gap 115 between the bottom of the regulator valve casing and the underlying top wall of the heat exchanger casing. Air flows freely through this gap and serves as a most effective thermal insulator with the result that fluctuating temperature conditions surrounding the temperature regulator are well within the operating capabilities of the thermal element of this device.

Hot water from the engine cooling system flowing rapidly about the exterior of coil 33 heats a portion of the cold gases to an elevated temperature relatively quickly and efficiently. Furthermore, the heat provided by the hot water vaporizes any particles of liquid present in the gas stream and delivers the same from the exhaust outlet 34 at a temperature in the vicinity of 150 degrees F. This relatively hot portion of the gaseous fuel flows into passageway 63 surrounding the lower portion of the temperature regulating valve 35 while the unheated cold fuel vapor collects about the exterior upper half of this same valve for admixture in the proper proportions and rates to achieve a resulting product of the desired temperature.

The principal components of the thermostatic control valve 35 include a flanged cover member 90 having an outlet coupling 91 projecting upwardly. Threadedly received in a cavity interiorly of cap 90 is a cup 92 having fuel passages 93 in its top and a flanged rim designed to clamp a valve seat ring 94 assembled to the lower side of cap 90. The upper rim 95 of another ring 71 forms a second valve seat of the same diameter but spaced axially below ring seat member 94. Resiliently supported between valve seat rings 94 and 95 is a floating proportioning ring 96 having substantially the same diameter as rings 94 and 95 and an axial extent appreciably less than the distance between the seating rims of rings 94 and 95.

Floating ring 96 is resiliently supported between a pair of coil springs 97 and 98 by means of a pair of concentrically arranged thimbles 99 and 100. The lower end of spring 97 seats in ring 71 while its upper end bears against the perforated radial flange of thimble 99. Likewise the lower end of spring 100 bears against the inturned flange 101 on thimble 99 while its upper end bears against an outwardly projecting flange on thimble 100.

The bulb 102 of a suitable expansible fluid thermo element seats in a central opening of cup 92 and has a stem 103 projecting downwardly through a bore in thimble 100. Its lower end bears against an adjustable connection 104 interposed between the bottom of thimble 100 and stem 103. A stop ring 105 encircles the adjusting device 104 and spans the radial gap between thimbles 99 and 100 as made clear in Figure 2. Ring 105 therefore provides a stop limiting the upward movement of thimble 100 with respect to thimble 99 while leaving thimble 100 free to move downward independently of thimble 99.

A soft metallic seal-supporting ring 106 surrounds floating ring 96 of the floating valve member and has a tight frictional seat with a bore in the main casing 64. Its inner diameter is provided with an inwardly facing flaring groove 107 in which is mounted a resilient sealing washer 108 having light sealing engagement with the smooth exterior surface of floating ring 96. Accordingly, no gas flow can take place except through the hollow interior of the cylindrical floating valve member and the cooperating seats at either end thereof.

The mode of operation of the valve will be quite apparent from the foregoing. Thus, if the temperature responsive fluid within bulb 102 of the thermostat cools ever so slightly stem 103 will move upwardly allowing spring 97 to move cylinder 96 upwardly closing gap 109 and opening gap 110 in the same amount between the lower end of the floating cylinder 96 and cooperating seat 95. As a result the flow of cold gases from passageway 37 will be reduced and flow of preheated hot fuel vapors from passage 63 will be increased to the extent required to maintain a constant temperature of the fuel vapors flowing through conduit 20 and to the second-stage regulator. This change in flow at the valve will produce a corresponding change in flow at the inlet end of the heat exchanger and a greater proportion of the cold fuel vapors will flow downwardly through passage 62 into the inlet of the heat exchanger. Likewise if the temperature of the fuel vapors passing thermal member 102 increases, the thermostat will expand and lower floating ring 96 to increase the flow of cold vapors past seat 94 and decrease the flow of hot vapors past seat 95. Again this change will be accompanied by a corresponding change in the distribution of the cold gases between conduits 37 and 62.

It is to be particularly noted, however, that these changes in the proportion of fuel passing to the heat exchanger have no effect upon the operation of the high pressure regulator inasmuch as the same quantity of fuel is being discharged from outlet 91 irrespective of the proportion passing through the heat exchanger.

Referring now to Figures 3 to 7 and with special reference to Figures 3 and 4, it will be noted that the unitary second-stage regulator generally designated 21 comprises three main components, namely; a safety cut-off valve 40, a low pressure regulator 41, and a carbureting device 42. These are housed in a common main body 120 having the configuration illustrated in the drawings and is designed for connection directly to the engine throttle valve 23 by means of bolt holes 121 formed in the opposite ends of the carburetor housing 42. Only two of the holes are shown but it will be understood that there are four such holes at the opposite ends of the carbureting chamber.

By reference to Figure 1, it will be seen that gaseous fuel at a constant predetermined temperature and intermediate pressure passes through the main fuel line 20 and enters the second-stage regulator through the main fuel inlet opening 122 and into an annular chamber 123. This gas then passes through cylindrical filter 54 formed of suitable porous material offering a very low pressure loss but capable of filtering out any fine particles of foreign material carried by the gas as it passes into central chamber 124 encircling the main shut-off valve thimble 125. The latter is provided with a resilient seating ring 126 positioned to seal against the valve seat 127 to cut off the flow of fuel when the engine is not operating. Valve thimble 125 is urged towards seat 127 by compression spring 128 the lower end of which seats about the base in which pilot valve assembly 130 is mounted. The flanged lower rim of valve thimble 125 is clamped to a hole in the center of a flexible diaphragm 50 by means of a lock nut 131, while the outer rim of the diaphragm is tightly clamped to casing 120 by a contoured disk 132. Disk 132 is sandwiched between the master shut-off diaphragm 50 and a thin flexible pilot diaphragm 51 having a cover plate 133. Plate 133, disk 132 and the two diaphragms are tightly clamped to the main casing by suitable screws 134 illustrated in Figure 5. The master diaphragm 50 separates chambers 124 and 135 while the pilot diaphragm 51 separates chamber 136 from a shallow underlying chamber 137. Chambers 124 and 135 are in communication with one another through a small aperture 55 in the side wall of thimble 125.

A very light pilot valve 130 similar to the dill valve of the inner tube for a tire is normally urged closed by an internal spring mounted in a hollow boss 129 projecting upwardly from the center of disk 132. The valve member proper 58 is shown in closed position in Figure 4 and in its open position in Figure 3. When the pilot valve is closed the gas passing into chamber 135 through aperture 55 cannot escape. Consequently, the pressure in chamber 135 soon reaches the same value as in chamber 124. Under these circumstances spring 128 holds the master control valve 125 firmly sealed against seat 127. Under these conditions the gas in chamber 124 cannot pass through bore 140 leading to inlet chamber 141 of the low pressure regulator.

On the other hand, when the pressure in pilot chamber 136 is less than atmospheric, the atmospheric pressure maintained in chamber 137 through bleed port 52 is effective to move diaphragm 51 upwardly against the lower end 142 of pilot valve 58 to hold it open as shown in Figure 3 and with diaphragm 51 held against the raised boss in the center of disk 132. The small quantity of gas required to be bled from chamber 135 to assure holding the master valve 125 fully opened can then flow downwardly through the hollow interior of the pilot valve, outwardly through channel 143 in disk 132 and into the engine manifold by way of bleed passage 53, as best shown in Figure 1.

The low pressure regulator generally designated 41 is housed in the right-hand end of casing 120 and includes a main casing 144 anchored in a horizontally extending bore 145 of the main casing by means of cap screws 146. Assurance of a fluid seal between body 144 and the casing wall is provided by O-rings 147 and 147'. A relatively small bore cavity 148 in body 144 houses a spring 149 surrounding a valve stem 150 slidably mounted in bore 151 and having an O-ring 152 carried therebetween. The interior end of stem 150 is carried by the center of the low pressure regulator diaphragm 47 and is held assembled thereto by means of a nut 153 while the periphery of the diaphragm is secured in place by a cap ring and screws 156. The left-hand end of the valve stem carries a valve 154 cooperating with the end of the short tube 155 to control the pressure and flow of fuel through passage 46 to carburetor device 42. The right-hand end of bore 148 of the regulator communicates with inlet chamber 141 of the regulator through a metered bleed orifice 157 approximately 20 mils in diameter. The low pressure side of the regulator is represented by relatively short passage 46 extending between valve 154 and the vapor distributing ring 158 of the carburetor.

The pressure on the right-hand end, or control side of pressure regulator diaphragm 47, is controlled to a very fine degree by means of a sensitive pilot valve 48 under the control of the differential pressure diaphragm 49 underlying a cover plate 160 secured to the main casing as by screws 161, in the manner shown in Figure 6. As clearly illustrated, diaphragm 49 separates chamber 162 from chamber 163.

Diaphragm 49 is made from light readily flexible material such as sheet rubber. A light metal plate 164 is cemented to the lower side of the diaphragm having a downturned tang with a bevel-edged hole 164 forming a sliding socket for the left-hand end of an L-shaped lightweight lever 165 pivoted by a pin 166 to a rigid supporting bracket 167 clamped by a set screw 168 to the outer end of valve stem 150. Hence it will be clear that lever 165 is movable bodily along with the regulator valve.

The opposite short end 169 of the lever is biased between a pair of light coil springs 170 and 171. Spring 170 surrounds the outer end of valve seat 48 and accordingly is held in assembled position thereby. Spring 171 is supported between bosses carried by lever 169 and by the inner end of an adjustable screw 172. This screw is threadedly supported in end cap 173 for the low pressure regulator assembly and may be firmly locked in any adjusted position by a lock nut 174. This infrequently serviced adjusting screw is normally concealed by a cap nut 175.

Pilot valve 48 has an axial bore communicating with a T-shaped passageway 176 in valve stem 150. The outer right-hand end of this passage can be opened or closed by the movement of lever arm 169 toward or away from its open end. It will, of course, be appreciated that the position of closure member 169 is controlled by the diaphragm 49 in accordance with the pressure difference existing between chambers 162 and 163. Chamber 162 is in communication with the air inlet end of the venturi-shaped carbureting chamber through a small diameter passage 57 best shown in Figure 1. The other chamber 163 communicates through a large bore passage 56 with the vapor distributing ring 158 surrounding the throat of the carburetor chamber. Thus it will be understood that the pressure difference across the diaphragm is that existing between the carburetor air intake and the pressure at the distributing annulus of the carburetor. Stated differently, chamber 163 of the pilot control diaphragm 49 communicates with the low pressure side of the regulator at the point of fuel admission to the carburetor while chamber 162 on the opposite side of the diaphragm measures the air intake pressure whether this be a fluctuating atmospheric pressure or the discharge pressure of a supercharger coupled to the carburetor as is often desirable. Since this pressure difference is of a low order of magnitude, my pilot diaphragm and the pilot valve it controls provides an automatic corrective adjustment for the low pressure regulator of extreme sensitivity yet one which is substantially immune to shock vibration and rugged operating conditions. Furthermore, since the moving member 169 of the pilot valve moves directly with the valve seat by reason of the rigid connection 167 between the pilot valve body and the pivoting mounting provided for the valve operating lever 165, a movement between valve seat 48 and valve member 169 of as little as one mil suffices to provide a variation in the pressure existing on the right-hand side of the low pressure regulator diaphragm 47. In fact the device is so sensitive that I have found it easily possible to regulate and maintain the fuel pressure on the discharge side of the regulator within a few hundredths of an inch of water pressure under widely varying engine operating conditions.

The carburetor 42 is a simple venturi tube extending centrally of casing member 43. Surrounding the throat is a vapor distributing ring 158 having direct communication with fuel inlet passage 46. The throat of the venturi communicates with the distributing ring through a plurality of accurately metered inlet passages 180.

However, it has been found that an additional adjustment is desirable to accommodate variations in fuels. Such an adjustment is provided by a threaded screw 181 projecting radially through the side wall of the carburetor casing and locked in any adjusted position by a lock nut 182. The tapered inner end 183 of this screw controls a tapering auxiliary fuel port 184 extending between the distributing passage 158 and throat 45. The adjustment of this screw therefore provides a very fine and accurate adjustment for additional fuel flow into the carbureting system.

The fuel jetting inwardly through ports 180 is projected crosswise towards the axis of the downflowing fresh air stream. Accordingly, the vapor mixes rapidly with the air and passes with it through passage 22 connected to the engine manifold 24. Convenient control for the fuel and air mixture flowing to the engine is obtained by any suitable engine throttle valve 23. If this valve is closed, the volume and velocity of air flowing through the throat of the carburetor decreases. This changes the differential pressure conditions existing between the throat of the venturi and its intake end which is immediately detected and measured by the pilot valve diaphragm 49 and a corrective action is instantly transmitted to pilot valve 48. Stated differently, the change in pressure effects a change in the amount of fuel bled from the right-hand or control side of the pressure reducing diaphragm 47. As a result, the position of the pressure regulating valve 154 is changed to modify the fuel flow to the carburetor.

If it is found that the engine idles at too high or too low a speed, adjustment to a different idling speed is accomplished merely by removing cap 175, releasing lock nut 174 and adjusting the fuel idling control screw 172 to vary the spring bias pressure on pilot valve member 169. After a proper speed adjustment is obtained lock nut 174 is tightened, and the cap screw is replaced.

If the motor should stall or should be stopped for any reason, whether by the deliberate action of the operator or otherwise, it is highly important that the flow of fuel to the engine be terminated instantly. Otherwise, there is a definite possibility that the highly ignitable fuel will bleed from the carburetor and settle about the hot and oil covered engine where it is readily ignited. This cannot possibly occur when the present fuel system is used. This is because the moment the engine ceases rotating, the suction pressure within the manifold rises to atmospheric pressure and is reflected directly to the master control valve through bleed passage 53 to equalize the pressures on the opposite sides of diaphragm 51. Thereupon the spring biased pilot valve 58 closes to discontinue flow of gas from the master valve control chamber 135. Within a second, the relatively high fuel pressure in the supply line 20 builds up in chamber 135 by leakage through aperture 55 causing spring 128 to hold the master control valve 125 firmly sealed against seat 127.

It is also to be borne in mind that immediately following closure of the master shut-off valve, and usually shortly before this occurs, the pressure regulator valve 154 will have seated against the right-hand end of tube 155. Note that even the amount of fuel required for engine idling purposes is completely shut off along with that required for normal engine operations.

Resumption of fuel flow occurs as soon as the engine starts to turn over sufficiently to cause a slight suction pressure in the engine manifold. This suction pressure is transmitted through bleed passage 53 to reduce the pressure in chamber 136 controlling the shut-off valve. Even a slight pressure reduction in chamber 136 suffices to permit atmospheric pressure acting through bleed opening 52 on the outer side of the diaphragm to open pilot valve 58 and allow the gas to bleed quickly from chamber 135. Since the capacity of the pilot valve 58 is considerably greater than that of bleed port 55, a fraction of a second suffices to reduce the pressure in chamber 135 sufficiently for the main line pressure in chamber 124 to act through diaphragm 50 and open the main fuel valve 125. The pressure of the fuel then acts through passage 140 and chamber 141 directly on the left-hand side of the regulator diaphragm 47 to compress spring 149 allowing valve 154 to open. The fuel thereupon passes through duct 46 into the carburetor where it mixes with the air flowing to the manifold. At this occurs the pressure differential acting on the pilot control diaphragm 49 acts to control the rate of fuel bleed from the chamber on the right-hand side of the regulator diaphragm. This acts as explained above to regulate the pressure of fuel flowing to the carburetor in an extremely accurate and instantly responsive manner.

Referring now to Figure 8, a second embodiment of the invention is shown somewhat schematically since it differs from the embodiment just described only to the extent required to add a supercharger to the air intake of the carbureting device. Accordingly, all similar or corresponding elements are designated by the same reference characters as in the first described embodiment but are distinguished by a prime. The second-stage regulator 21' is merely shown in outline form. A supercharger of any suitable type 190 has an inlet 191 for air, and a superatmospheric air discharge conduit 192 connected to the air inlet end 44' of the carbureting device 42'. The connection between this device and conduit 192 will, of course, be sealed since air under pressure is being handled. A conduit 193 connects the discharge end of the carbureting device to the manifold of the engine in the same manner as described above. The pressure regulated fuel supply enters the distributing ring 158' of the carburetor through inlet conduit 46' and passes to the throat of the venturi through ports 180' in exactly the same manner as described above.

Substantially the only other difference concerns the mode of connecting the pilot control diaphragm 51' for the main shut-off valve into the system. Thus, chamber 137' for the pilot diaphragm is connected by a conduit 194 to conduit 192 leading into the inlet of the carbureting device. Chamber 136' of the pilot diaphragm is connected by conduit 53' to the engine manifold where it is subject to the suction pressure of the engine when it is operating. The suction pressure supplemented by the pressure supplied by the supercharger acts through stem 142' to hold the pilot valve open. This will, of course, allow fuel to escape from chamber 135 of the shut-off valve and the remainder of the device will operate exactly in the same manner described above in connection with Figures 1 to 7.

From the foregoing it will be apparent that my gaseous fuel system may be employed with or without a supercharger merely by connecting a supercharger to the air inlet of the carburetor and providing a small bore conduit leading to the vent opening of the pilot chamber for the shut-off valve. Minor adjustments in the remainder of the mechanism may be desirable for the most efficient results, but no other structural changes of any kind are required.

While I have described but two embodiments of my invention, it will be quite apparent that various structural changes in the arrangement and construction of the several parts may be made without departing from the essential principles of the invention. I desire therefore not to limit myself to the exact form of the construction shown and described but intend in the following claims to point out and claim the novel features thereof. I claim as new and desire to secure by Letters Patent:

I claim:

1. In a liquid petroleum fuel system for internal combustion engines of the type having a storage tank for liquid petroleum connected to the intake manifold of a combustion engine wherein said fuel connection includes various auxiliaries for converting high pressure liquid fule to a properly proportioned gaseous fuel and air mixture suitable for energizing said engine; that improvement which comprises grouping one set of said auxiliaries in a unitary first stage assembly substantially isolated from said engine and including a high pressure regulator and a gaseous fuel temperature regulator, and grouping a second set of said auxiliaries in a unitary second stage assembly closely adjacent the engine intake manifold and including a carburetor device and a low pressure fuel regulator, said first stage assembly and said second stage assembly being interconnected by a single fuel conduit.

2. In a liquid petroleum fuel system as defined in claim 1, wherein said first stage assembly includes a heat exchange device integral therewith having one passage connected in circuit with a heating medium and a second passage connected in circuit with the fuel line on the discharge side of said high pressure regulator.

3. In a liquid petroleum fuel system as defined in claim 1, wherein said first stage assembly includes a dual passage heat exchanger within the housing thereof and connected directly to the discharge side of said high pressure regulator, means connecting one of said passages in circuit with a source of heat, and means for conducting a portion only of the gaseous fuel through the other passage of the heat exchanger and thereafter admixing the same with other gaseous fuel by-passing said heat exchanger.

4. In a liquid petroleum fuel system as defined in claim 3, wherein said admixture of pre-heated and non-heated portions of gaseous fuel takes place in a chamber having pre-heated and non-heated gaseous fuel inlets proportionally controlled by said temperature regulator and including a thermally responsive actuator therefor subject to the discharge temperature of said gaseous fuel.

5. That method of generating a combustible fuel and air mixture for an internal combustion engine of the self-contained type and from a high pressure source of liquefied petroleum connected with the engine which method comprises; allowing high pressure liquefied petroleum to expand into a gaseous state at a controlled pressure, passing a portion of the resulting cold gas into a source of heat exchange with heat in an area immediately adjacent the expansion zone and removed from the engine, mixing the portion of gaseous fuel so heated with unheated gaseous fuel in proportions required to provide a combined stream of pressurized gaseous fuel of a predetermined temperature, thereafter conducting the fuel to a point closely adjacent the engine and there further reducing its pressure to a predetermined value, then mixing the same with atmospheric air in proportion to the volume of air flow and conducting the resulting combustible mixture to the intake manifold of said engine to energize the same.

6. That method of supplying an internal combustion engine with a properly proportioned mixture of air and gaseous fuel derived from a pressurized tank of liquefied petroleum which method comprises, passing liquid petroleum through an initial processing operation at a point remote from the engine and then through a second processing operation in close proximity to the engine, said initial processing including expanding the liquefied petroleum to a gas at a substantially lower predetermined pressure and temperature, raising the temperature of the gaseous fuel to a predetermined fixed value by passing a portion only of the cold gas in heat exchange to a source of heat derived from the waste heat of combustion of previously processed portions of the fuel, mixing the gas so heated with portions of the cold gas immediately adjacent the expansion zone of said liquid petroleum to provide a supply of gaseous fuel at a predetermined pressure and temperature, conducting said fuel supply to a point in close proximity to the engine for said second processing operation, and there reducing the pressure of said fuel to a value equal to the incoming air pressure and then mixing the fuel with atmospheric air in proportion to the quantity of air being supplied to the engine.

7. That method of supplying an internal combustion engine with fuel as defined in claim 6 including discontinuing the supply of gaseous fuel to the engine automatically upon cessation of the rotation of the engine by utilizing the fuel supply pressure to positively terminate said fuel supply at a point closely adjacent the engine and using the inlet suction pressure of said engine when rotating to render the fuel supply pressure ineffective to cut off the flow of said fuel supply and to continue doing so as long as said engine rotates.

8. In combination with an internal combustion engine, a liquid petroleum fuel supply system therefor comprising two unitary fuel converter devices connected in series with a pressurized container of liquefied petroleum and said engine, one of said devices being nearer said container and remote from said engine and the second device being more remote from said tank and closely adjacent the engine intake manifold, said one device including a high pressure regulator for converting the high pressure liquid fuel to gaseous fuel at a lower super-atmospheric pressure, heat exchange means for heating said gaseous fuel to a predetermined temperature within the confines of said one converter device from the waste heat of combustion of fuel, said heat exchange means including thermal means responsive to the temperature of said gaseous fuel and operable to route varying proportions of the gaseous fuel in a path out of direct heat exchange with the waste heat of combustion as necessary to raise the temperature of all the gaseous fuel discharging from said converter device to said predetermined temperature, said second converter device having low pressure regulator means for lowering the super-atmospheric pressure of said heated gaseous fuel to a pressure substantially that of the incoming air, and means for forming a combustible mixture of said fuel with incoming air and delivering the same into said engine intake manifold.

9. The combination defined in claim 8 wherein said second converter device includes a safety shut-off valve for positively discontinuing the flow of fuel to said engine, said valve having a pressure responsive diaphragm control means therefor, means placing one side of said diaphragm control in communication with said intake manifold and the other side in communication with the atmosphere, said diaphragm control being operable to open said safety shut-off valve in response to the suction pressure created in said manifold when said engine rotates and to close said shut-off valve automatically when said suction pressure ceases due to the stopping of said engine for any reason.

10. A liquid petroleum converter device for use in supplying gaseous fuel to an internal combustion engine, said converter comprising a unitary assembly having a pressure reducing regulator sub-assembly therein provided with an inlet adapted ot be connected to a source of pressurized liquid petroleum, temperature control means for heating the gas discharging from the low pressure discharge side of said regulator, said temperature control means including a dual passage heat exchanger, means for connecting one of said passages in circuit with a heating medium, means for circulating a portion only of said low pressure gaseous fuel through the other of said heat exchanger passages, and thermally responsive means for mixing different proportions of heated and unheated gaseous fuel together as necessary to provide a mixture of a predetermined temperature.

11. A liquid petroleum converter as defined in claim 10 wherein said thermal responsive means is structurally in close proximity to said heat exchanger and pressure regulator but thermally separated therefrom by an intervening air space.

12. A liquid petroleum converter device as defined in claim 10 wherein said pressure reducing regulator is removable as a unitary sub-assembly from the remainder of said device.

13. A liquid petroleum converter device as defined in claim 10 wherein said thermally responsive means is readily removable independently of the pressure regulator.

14. In combination with a high pressure regulator device adapted to convert pressurized liquid petroleum to gas, a device for temperizing and discharging said gaseous fuel at a predetermined constant temperature, said device comprising valve means having axially spaced opposed annular seats, a cylindrical proportioning valve member reciprocably mounted in a partition separating said annular seats and movable against either of said seats, means biasing said last mentioned valve toward one of said seats, thermally responsive means on the discharge side of said valve means operable to move said proportioning valve toward the other of said seats, means for conducting gaseous fuel directly from the discharge side of said pressure regulator to one end of said proportioning valve, and heat exchange means for conducting another portion of said gaseous fuel to the other end of said proportioning valve after passing in heat exchange with a heating medium.

15. The combination defined in claim 14 wherein said thermally responsive means is housed within a casing removable therefrom independently of said pressure regulator and along with at least one of said annular seats and said cylindrical proportioning valve.

16. The combination defined in claim 14 wherein said high pressure regulator and said heat exchanger are separated from said device for discharging the gaseous fuel at a predetermined temperature by an air gap so as to thermally isolate said device from the effects of fluctuating temperature conditions in said regulator and heat exchanger.

17. In combination with a storage tank for liquefied petroleum and means for converting said petroleum to gas at a super-atmospheric pressure, a pressure reducing and carbureting assembly comprising a casing housing, a safety cut-off valve, a low pressure regulator independent of said cut-off valve and a gaseous fuel and air carbureting device all connected in series fluid circuit with one another within said housing, diaphragm means for controlling the position of said safety cut-off valve including means for exposing one side thereof to atmospheric pressure and the other side to the suction pressure of an engine intake manifold.

18. In combination with a low pressure regulator and a gaseous fuel and air carbureting device for use in a gaseous fuel system for an internal combustion engine, a safety fuel cut-off valve for cutting off the flow through said device automatically upon failure of the engine to operate for any reason, said cut-off including a master valve and a diaphragm actuator therefor movable between open and closed positions with one side of said diaphragm subject to the fuel supply pressure and the other side exposed to a vented chamber, restricted passage means extending between the opposite sides of said diaphragm, pilot valve means controlling flow through the vent of said vented chamber, pressure responsive means for operating said pilot valve and adapted to be connected with an engine intake manifold, said cut-off valve being movable to its open position by the gaseous fuel pressure when the suction pressure in the manifold of a rotating engine opens the pilot valve for said vented chamber and to its closed position automatically when said pilot valve closes due to the collapse of the suction pressure in the manifold as the engine ceases to rotate.

19. In combination, a unitary assembly including a low pressure regulator for use with a gaseous fuel supply system of an internal combustion engine and a fuel and air carbureting device integral therewith, said assembly including a main casing, a venturi tube therein having a discharge end adapted to be connected with an engine manifold, an inlet end adapted to receive a supply of ambient air, means for supplying low pressure gaseous petroleum to the throat of said venturi, a spring biased diaphragm supported valve means controlling the flow and regulating the pressure of gaseous fuel passing to said venturi throat, one side of said diaphragm being exposed to the high pressure supply of said gaseous fuel on the opposite side thereof from said spring bias, means for supplying a restricted amount of pressurized gas to the spring biased side of said diaphragm, a pilot valve for bleeding gas from said last-mentioned side of said diaphragm, diaphragm means for controlling the position of said pilot valve, and means connecting the opposite sides of said pilot operating diaphragm to different pressure areas, one of said pressure areas being to the atmosphere and the other being to the exhaust side of the low pressure regulator.

20. In combination with the intake manifold of an internal combustion engine, a carbureting device for air and gaseous fuel having a mixing chamber formed by a venturi tube, means for supplying air to the intake end of said tube, means for conducting a plurality of streams of gaseous fuel into the throat of the venturi tube, means for conducting the resulting mixture of fuel and air to said intake manifold, a pressure regulator having a gas outlet opening directly into said venturi and including a flexible diaphragm positioned to control the gas flow through said outlet opening, a second flexible diaphragm-controlled valved-passage means for controlling the pressure of the gas on the opposite side of said first mentioned diaphragm from said outlet opening, and means connecting one side of said second diaphragm to the air intake end of the venturi and the opposite side to the gas outlet of said pressure regulator.

21. The combination defined in claim 20 including means for delivering air to the intake of said venturi tube at a super-atmospheric pressure and wherein said second flexible diaphragm of said pressure regulator is subject to control by the pressure differential between the super-atmospheric pressure of the intake of said venturi and the gas outlet of said pressure regulator.

22. In a fuel supply system of the type adapted to convert liquefied petroleum into low pressure gaseous fuel in accordance with the fuel demand requirements of an operating internal combustion engine by means of a plurality of pressure-reducing regulators and a carbureting device connected in series: that improvement which comprises a fuel pressure-controlled safety shut-off valve biased toward closed position and connected into the fuel supply line in advance of the final pressure reducing regulator, said valve having a movable member subject to control by a flexible diaphragm having one side exposed directly to the fuel supply line pressure, bleeder means for admitting fuel from the supply line to the other side of said diaphragm, and valve means responsive to a subatmospheric pressure adapted when open to bleed gas from said other side substantially faster than gas is supplied thereto through said bleeder means.

23. A combined gaseous fuel pressure regulator and safety shut-off valve assembly comprising a unitary assembly having a housing, a first flexible diaphram mounted therein and movable to control gas flow through an outlet opening leading to a gas and air mixing chamber, a gaseous fuel supply passage leading into a chamber within said housing, a valved passage connecting said chamber with said pressure regulator on the outlet side of said flexible diaphragm, a gaseous filter means in said chamber between said fuel supply passage and said valved passage, second diaphragm-controlled valve means controlling the flow of fuel between said chamber and said regulator, and diaphragm-controlled pilot valve means connected to one side of said second diaphragm for controlling the flow of fuel gas therefrom when said third diaphragm is subjected to a sub-atmospheric pressure on one side thereof.

24. A gaseous fuel carbureting device comprising a housing having a venturi-shaped gas and air mixing chamber provided with fuel, a distributing annulus and inlet passages to its throat in an area disposed between an air inlet and a combustible mixture outlet, a valved-passage means for conducting gas to said throat, a flexible pressure regulating diaphragm in said housing for controlling flow through said valved passage and spring biased in a direction to shut off flow when the gas supply pressure falls below a predetermined value, means for bleeding gas from said gas supply to a closed chamber on the opposite side of said diaphragm from said passage means, perforated tubular means movable with said diaphragm and having a ported end extending through a wall of said chamber, differential pressure responsive means having its opposite sides connected respectively to said fuel distributing annulus and to the air inlet end of said mixing chamber, and means actuated by said last-named means for controlling the escape of gas from the ported end of said tubular means in accordance with differential changes in pressure between the air inlet and the fuel distributing annulus of said mixing chamber.

25. A gaseous fuel carbureting device as defined in claim 24 including a supercharger for delivering air to the air inlet of said gas and air mixing chamber at super-atmospheric pressure, a safety shut-off valve for shutting off the flow of fuel to said carbureting device, diaphragm-controlled pilot valve means for actuating said shut-off valve to closed position when the engine is not rotating including a suction pressure conduit connecting one side of said diaphragm to the engine manifold and another conduit connecting the other side to the air inlet end of said gas and air mixing chamber.

26. A gaseous fuel carbureting device as defined in claim 24 wherein the means controlling the escape of gas from the ported end of said tubular means is mounted on and movable with said tubular means.

27. A gaseous fuel carbureting device as defined in claim 26 including means providing a sliding connection between said differential pressure responsive means and said control means for the ported end of said tubular means whereby the movement of said tubular means can take place without interference with the position of the differential pressure means.

28. A gaseous fuel carbureting device as defined in claim 26 including adjustable spring bias means for adjusting the bias between the port control means and said pressure differential means.

29. A gaseous fuel carbureting device as defined in claim 24 wherein said pressure-regulating diaphragm and the parts connected thereto are removable as a unitary sub-assembly from the housing of said carbureting device.

30. In a carbureting device for gaseous fuel, a housing having an open-ended tube mounted in the wall thereof and forming a fuel outlet passage, a flexible diaphragm-controlled valve cooperating with the inner end of said tube for regulating the pressure of the gas escaping therethrough, a chambered casing supporting said diaphragm in an opening through the wall of said housing, tubular means movable with said diaphragm extending through the wall of said casing, metered orifice means for admitting gas from the gas supply line into said chambered casing, and pilot valve means on said tubular means exteriorly of said casing for controlling the escape of gas from said casing, and means adapted to conduct the escaping fuel to an internal combustion engine to operate the same at idling speed.

31. A carbureting device as defined in claim 30 wherein said flexible diaphragm-controlled valve, the casing therefor, said tubular means and said pilot valve means are all removable from said housing as a unitary sub-assembly.

References Cited in the file of this patent

UNITED STATES PATENTS

| | | |
|---|---|---|
| 1,660,609 | Fornaca | Feb. 28, 1928 |
| 1,905,971 | Davisson et al. | Apr. 25, 1933 |
| 2,073,276 | Ensign | Mar. 9, 1937 |
| 2,143,194 | Holzapfel | Jan. 10, 1939 |
| 2,240,846 | Hanson | May 6, 1941 |
| 2,258,003 | Dickson | Oct. 7, 1941 |
| 2,315,881 | Thomas | Apr. 6, 1943 |
| 2,319,971 | Bodine | May 25, 1943 |
| 2,675,793 | Ziege | Apr. 20, 1954 |
| 2,701,133 | Mendez | Feb. 1, 1955 |
| 2,752,758 | Tann | July 3, 1956 |
| 2,753,856 | Rush | July 10, 1956 |
| 2,757,516 | Buttolph | Aug. 7, 1956 |